United States Patent
Ivanov et al.

(10) Patent No.: US 9,509,994 B2
(45) Date of Patent: Nov. 29, 2016

(54) BROADCAST VIDEO DECODER WITH REDUCED MEMORY AND PROCESSING REQUIREMENTS SUITABLE FOR HANDHELD AND MOBILE APPLICATIONS

(75) Inventors: Yuri Ivanov, Dublin (IE); David Moloney, Dublin (IE)

(73) Assignee: LINEAR ALGEBRA TECHNOLOGIES LIMITED, Dublin (IE)

( * ) Notice: Subject to any disclaimer, the term of this patent is extended or adjusted under 35 U.S.C. 154(b) by 519 days.

(21) Appl. No.: 13/639,917

(22) PCT Filed: Apr. 7, 2010

(86) PCT No.: PCT/EP2010/054594
§ 371 (c)(1),
(2), (4) Date: Apr. 17, 2013

(87) PCT Pub. No.: WO2011/124254
PCT Pub. Date: Oct. 13, 2011

(65) Prior Publication Data
US 2013/0202040 A1    Aug. 8, 2013

(51) Int. Cl.
*H04N 19/51*    (2014.01)
*H04N 19/176*    (2014.01)
*H04N 19/513*    (2014.01)
*H04N 19/61*    (2014.01)
*H04N 19/117*    (2014.01)
*H04N 19/132*    (2014.01)
*H04N 19/182*    (2014.01)
*H04N 19/44*    (2014.01)
*H04N 19/86*    (2014.01)
*H04N 19/59*    (2014.01)

(52) U.S. Cl.
CPC ...... *H04N 19/00684* (2013.01); *H04N 19/117* (2014.11); *H04N 19/132* (2014.11); *H04N 19/176* (2014.11); *H04N 19/182* (2014.11); *H04N 19/44* (2014.11); *H04N 19/51* (2014.11); *H04N 19/513* (2014.11); *H04N 19/59* (2014.11); *H04N 19/61* (2014.11); *H04N 19/86* (2014.11)

(58) Field of Classification Search
USPC ........................................ 375/240.01–240.29
See application file for complete search history.

(56) References Cited

U.S. PATENT DOCUMENTS

| 5,828,421 | A  | * | 10/1998 | Boyce et al. ................. 348/565 |
| 6,044,178 | A  | * | 3/2000 | Lin ............................... 382/260 |
| 6,489,956 | B1 | * | 12/2002 | Deering ........................ 345/419 |
| 7,110,352 | B2 | * | 9/2006 | Wang ..................... H04L 5/026 370/208 |
| 8,532,199 | B2 | * | 9/2013 | Fujii et al. ............... 375/240.29 |
| 2004/0101059 | A1 | * | 5/2004 | Joch et al. ............... 375/240.29 |
| 2005/0058196 | A1 | * | 3/2005 | Fernandes .................. 375/240.2 |
| 2005/0117653 | A1 | * | 6/2005 | Sankaran ................ 375/240.24 |
| 2005/0175099 | A1 | * | 8/2005 | Sarkijarvi et al. ....... 375/240.16 |
| 2005/0265610 | A1 | * | 12/2005 | Natarajan et al. ............ 382/235 |
| 2006/0018382 | A1 | * | 1/2006 | Shi et al. ................. 375/240.16 |
| 2006/0174236 | A1 | * | 8/2006 | Stein et al. .................... 717/151 |
| 2008/0031519 | A1 | * | 2/2008 | Nelson ................... H04N 19/60 382/166 |
| 2009/0175343 | A1 | * | 7/2009 | Pearlstein ............... 375/240.16 |

FOREIGN PATENT DOCUMENTS

EP    0993195 A2 *    9/1999    .............. H04N 7/26

* cited by examiner

*Primary Examiner* — Leron Beck
(74) *Attorney, Agent, or Firm* — Marsh Fischmann & Breyfogle LLP; Kent A. Lembke

(57) ABSTRACT

The present application relates to an apparatus for programmable video size reduction with dynamic image filtering for use in block-based video decoding system. The invention improves the image quality within low video memory requirements and allows for efficient decoding of higher resolution video to be displayed on a lower resolution display device.

27 Claims, 5 Drawing Sheets

TABLE OF THRESHOLD VALUES α AND β

| Index | α | β |
|---|---|---|
| 0 ... 10 | 0 | 0 |
| 11 | 4 | 2 |
| 12 | 6 | 2 |
| 13 | 7 | 3 |
| 14 | 9 | 3 |
| 15 | 12 | 4 |
| 16 | 13 | 4 |
| 17 | 17 | 6 |
| 18 | 22 | 7 |
| 19 | 25 | 8 |
| 20 | 32 | 9 |
| 21 | 40 | 10 |
| 22 | 45 | 10 |
| 23 | 56 | 11 |
| 24 | 71 | 12 |
| 25 | 80 | 13 |
| 26 | 101 | 14 |
| 27 | 127 | 15 |
| 28 | 144 | 15 |
| 29 | 182 | 16 |
| 30 | 226 | 17 |
| 31 | 255 | 18 |

600

TABLE OF THRESHOLD VALUES c0      601

| Index | BS=1 | BS=2 |
|---|---|---|
| 0 ... 10 | 0 | 0 |
| 11 | 0 | 1 |
| 12 | 0 | 1 |
| 13 | 0 | 1 |
| 14 | 0 | 1 |
| 15 | 1 | 1 |
| 16 | 1 | 1 |
| 17 | 1 | 2 |
| 18 | 1 | 2 |
| 19 | 1 | 2 |
| 20 | 1 | 3 |
| 21 | 2 | 4 |
| 22 | 2 | 4 |
| 23 | 3 | 5 |
| 24 | 3 | 6 |
| 25 | 4 | 7 |
| 26 | 4 | 9 |
| 27 | 6 | 11 |
| 28 | 6 | 13 |
| 29 | 8 | 16 |
| 30 | 10 | 20 |
| 31 | 13 | 25 |

INDEX CONVERSION FORMULA $new\_Index = int\,(Index \times Total\_QP/31 - 1)$    (3)

610

CONVERSION EXAMPLE:

Total_QP = 52 values $new\_Index_{30} = int\,(Index_{19} \times 52/31 - 1) = 30$
$new\_Index_{32} = int\,(Index_{20} \times 52/31 - 1) = 32$

603

| new_Index | old Index | α | β |
|---|---|---|---|
| 30 | 19 | 25 | 8 |
| 31 | – | (25+32)/2 = 28 | (8+9)/2 = 8 |
| 32 | 20 | 32 | 9 |

Figure 6

BROADCAST VIDEO DECODER WITH REDUCED MEMORY AND PROCESSING REQUIREMENTS SUITABLE FOR HANDHELD AND MOBILE APPLICATIONS

RELATED APPLICATIONS

This application is a national phase of PCT Application No. PCT/EP2010/054594 filed on Apr. 7, 2010, entitled "Broadcast Video Decoder with Reduced Memory and Processing Requirements Suitable for Handheld and Mobile Applications," and which is incorporated by reference into this application in its entirety.

FIELD OF THE INVENTION

The present application concerns video decoding and relates, but not exclusively, to apparatus for programmable video size reduction with dynamic image filtering for use in block-based video decoding systems. The apparatus, outlined in the presented application, also allows for improving the image quality and reducing blocking artifacts when performing arbitrary video size reduction. Video decoding system, incorporating the invention, can efficiently decode higher resolution video and output high quality image on a lower resolution display device, while having low power, low memory and low processing requirements.

BACKGROUND OF THE INVENTION

The adoption of mobile TV has been generally frustrated by the business model and the cost of building new infrastructure to support mobile TV reception. As a result the adoption of new mobile TV standards such as DVB-H has been much slower than anticipated and only the Japanese ISDB-T 1-seg and Korean T-DMB standards have enjoyed any level of commercial success.

In contrast the adoption of terrestrial digital TV DVB-T has been rapid in Europe driven by legislation and the reallocation of broadcast spectrum. The present invention seeks to take advantage of terrestrial digital TV broadcast infrastructure by allowing existing free-to-air terrestrial digital TV broadcast signals intended primarily for TV reception in the home, to be received and displayed on a mobile phone and other handheld devices.

The main disadvantage with the reception of such signals is that the resolution of displays in the home is much higher than that which can be displayed on a mobile device. Processing and displaying such broadcasts therefore involves adapting the broadcast signal so that it can be displayed on a target display with much lower resolution, potentially ¼ or less resolution compared with a typical TV receiver present in the home.

One of well-known limitations in the design of a block-based video decoder for a portable device, such as mobile phone, is to support a high input resolution and at the same time providing high quality video decoding on the low resolution output. If typical design assumes that the decoded reference frames are saved in external memory (commonly SDRAM) in high resolution, unavoidable frequent memory access results also in high power consumption which is inappropriate for the mobile decoder.

It is possible to compress the reference frames after reconstruction and store them in the buffer for subsequent use. To operate efficiently, such a video coding system would require efficient and low complexity cost frame compressor and de-compressor. However, when developing an image compression system with random data access targeted to achieve a high compression rate, one obviously has to employ lossy compression method. This is not always possible for video coding system, where decoded frames have strict temporal dependency on each other. Current reference frame compression systems do not contain special provisions to cater for high resolution input followed by low resolution output.

Herein, the most advantageous approach would be to downsample video as early as possible during the decoding process. Thus, the Motion Compensation block of such a video coding system has to deal with frames at the low target output resolution, rather than the high input resolution. This solution has the advantage of having the memory requirements derived from the targeted low resolution output, not from the high resolution input. Also, high resolution video contains much detail that is redundant for low resolution display.

A number of approaches have been proposed for the MPEG-like decoders which can be divided into two categories, depending on where the downsampling is performed in the decoding process. In particular, the downsampling can be performed on the data being still in the compressed domain (i.e. IDCT), which provides additional complexity reduction, such as U.S. Pat. No. 5,708,732. However, these suffer from the disadvantage of being IDCT-domain specific and having fixed downsampling factor, i.e. explicitly designed for, say, MPEG-2 8×8 IDCT and, thus, cannot be utilized by other video decoders or programmed for arbitrary downsampling factors.

The second category assumes the actual downsampling prior the Motion Compensation process, i.e. after passing unmodified IDCT. In that case, there is wide choice of downsampling algorithms available ranging from low to high computational complexity, but adopting any of them leads to appearance of visible video decoding artifacts due to a nature of the downsampling method.

SUMMARY

The proposed invention has the dual advantages of solving both reference frames memory problem by employing 'on the fly' post-IDCT downsampling and using a filter to increase the perceived quality of the output video. A high quality of decoded video is achieved by adopting fast and efficient dynamic image filtering techniques that compensate for blocking artifacts produced by the method significantly increasing the quality of the output video. Moreover, the memory access frequency is reduced as less data needs to be retrieved. The invention also has a low power consumption advantage, which is advantageous for reasons including, for example, the environment and battery life. Since the downsampling factor is programmable, the invention has a wide field of application, such as low power mobile broadcast video decoding, 'picture in picture' scenario for HDTV etc.

Accordingly, the present application provides for apparatus and methods as set forth in the independent claims, with advantageous features and embodiments set forth in the dependent claims.

BRIEF DESCRIPTION OF THE DRAWINGS

The present invention will now be described with reference to the accompanying drawings in which:

FIG. 6 is an exemplary set of tables used for thresholds determination by the filtering algorithm.

DETAILED DESCRIPTION OF THE DRAWINGS

The embodiments disclosed below were selected by way of illustration and not by way of limitation. Indeed, many minor variations to the disclosed embodiments may be appropriate for a specific actual implementation.

Figure 1:
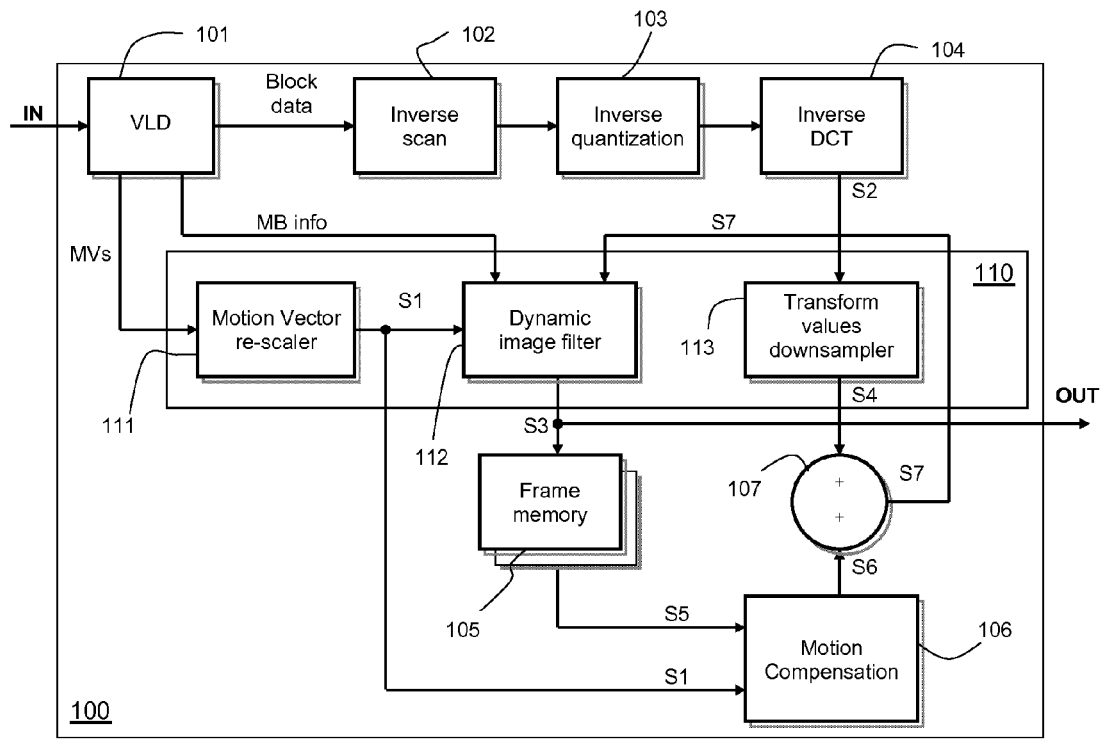
FIG. 1 is a high-level block-diagram of an exemplary embodiment of a video decoder that may exploit the proposed apparatus for programmable video size reduction with dynamic image filtering.

FIG. 1 illustrates a typical block-based video decoder 100 within which the modules 110 of the present invention are employed. It should be noted that the video decoder may also include other modules that are not shown in FIG. 1, since the purpose is only to illustrate the use of the invention in the actual video decoding system.

As with Prior art decoders, the decoder accepts the input stream IN, which represents encoded YUV samples of original video at resolution X by Y. In contrast to the Prior Art, the decoder produces output video OUT, which represents decoded YUV samples of reconstructed video at resolution X/N by Y/M. Herein, the video size reduction by factors N and M is performed during macroblock (MB) decoding process by proposed re-sampling apparatus 110 of the present invention. As with the Prior art, the decoder 100 comprises of a variable length decoder (VLD) module 101, inverse scan module 102, inverse quantization module 103, inverse DCT module 104. These features would be familiar to those skilled in the art and require no further explanation. As with the prior art, the decoder comprises a frame memory 105 and Motion Compensation module 106. These function in a similar manner to the prior art and thus no detailed explanation of their operation is required. However, in contrast to the prior art, these features operate on down-sampled, downscaled data.

The present invention is primarily directed to section 110 comprising of Motion Vector re-scaling module 111, dynamic image filter 112 module and transform values downsampling module 113. The modules 111, 112 and 113 cater for programmable downsampling factors N and M. Herein, fact that presented embodiments describe the invention for particular values of N and M does not assume that the invention itself has a limitation to be utilized only for these particular downsampling factors and it will be appreciated that a number of different values may be employed.

Those skilled in the art will clearly see that a main benefit of the invention comes from the arbitrary frame memory size reduction. For instance, this can be as much as 75% for N and M factors of two, since in that case the invention allows for the Motion Compensation module 106 operate with the macroblocks reduced half in size.

By contrast, the most commonly used video resizing technique assumes that the video frame is downsampled by a certain (typically fixed) factor only after being fully decoded. Indeed, this prior art method allows for a better quality, but comes at the cost of full-size frame memory buffer utilization, and similarly higher processing and power consumption requirements. If one wishes to decode MPEG-2 video in 1080p HD resolution (i.e. 1920×1088) and display it on a VGA (i.e. 640×480) display, this would require around 9.5 Mb of RAM for frame storage, while the present invention allows the same result to be achieved with approximately 1 Mb of frame memory.

The Motion Vector re-scaling module 111 may be programmed for any downsampling factor. It consists of a set of dividers that downscale the original motion vectors $MV_x$ and $MV_y$ by corresponding factors N and M. This is achieved using real division followed by integer rounding, since motion vector values, employed in the video coding, are integer by nature.

Utilization of such a re-scaling method with the downsampling module 113 would lead to the appearance of blocking artifacts, i.e. perceptually noticeable losses of a data in the decoded video visible as a square "mosaic" superimposed on the displayed image. The present invention includes a dynamic image filtering module 112 in addition to modules 111 and 113; not just utilization of modules 111 and 113 standalone. The dynamic image filter compensates for losses produced by modules 111 and 113 by attempting to remove blocking artifacts. Experiments have shown that this noticeably improves the image quality and improves the perceived decoded video quality, even when compared to the post-decoded video resizing technique mentioned above.

The output of a VLD 101, in particular, but not limited to, may be macroblock data, which is passed to the inverse scan module 102; or Motion Vectors (MVs) that are inputs for the Motion Vector re-scaling module 111 of the invention 110; or other macroblock information (e.g. macroblock type, macroblock quant etc.) that is required for dynamic image filter 112 and transform values downsampling module 113. The macroblock data decoding chain comprising modules 102, 103, 104 serves to produce inverse transform values S2, which are inputs for the downsampling module 113 of the invention. After passing through 113, downsampled inverse transform values S4 are combined with predictor values S6 in order to form unfiltered video output of YUV samples S7. This is performed by residuals combining module 107. In order to produce predictor values S6, the Motion Compensation module 106 requires previously decoded frames S5 that are stored in frame memory 105 along with re-scaled Motion Vectors S1. Finally, the unfiltered output S7 is passed to the dynamic image filter 112, which forms a constituent part of invention, and filtered YUV samples S3 are placed in frame memory 105 for further use by the Motion Compensation module 106. The S3 values also represent the video output OUT and can be passed for the display, when the whole video frame is fully reconstructed.

Figure 2:
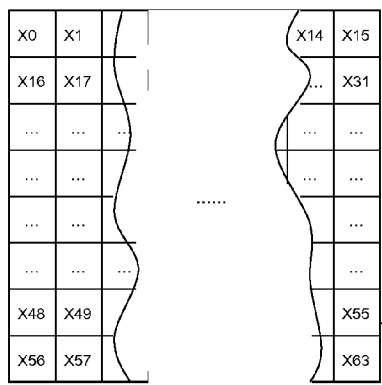
FIG. 2 illustrates a programmable downsampling module capable of an arbitrary downsampling ratio being used to achieve a downsampling factor of two in the video decoder of FIG. 1.
Figure 2:
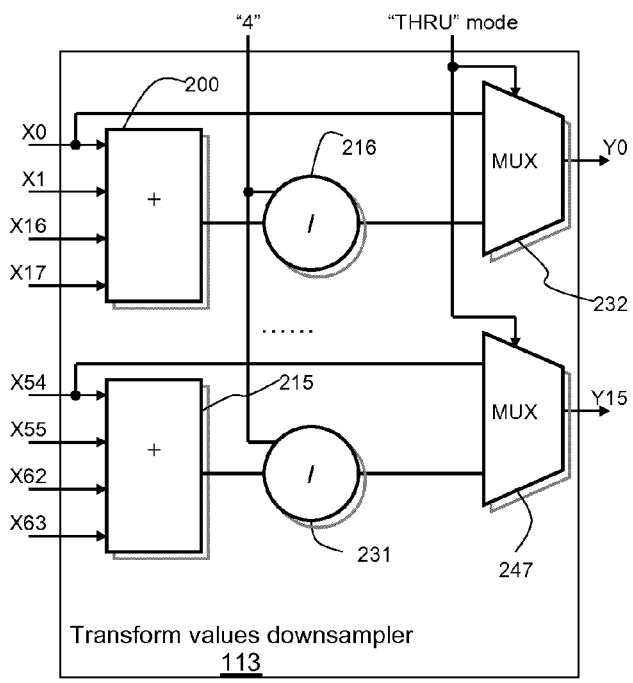

FIG. 2 depicts an example of arbitrary size downsampling module 113 which is programmed for the illustrative case when N and M are two. Herein, for every input 8×8 block S2 of inverse transform values X0 . . . X63, an output 4×4 block S4 of downsampled values Y0 . . . Y16 is produced. Such a downsampling module comprises set of summers 200 . . . 215 with output connected to dividing modules 216 . . . 231 with programmed division by four and multiplexers 232 . . . 247 that provide selection between the result of shifting module and every "first" X value based on "THRU" mode on/off switch. So the downsampler produces Y either by averaging four nearby X values, or, alternatively, takes a corner X value for every 2×2 block as Y if "THRU" mode is set. For other downsampling factors, module 113 can be re-programmed by adding/removing inputs X connected to the summers such as module 200 and choosing different division factor on dividers such as module 216.

The "THRU" mode can be used to achieve additional computational complexity reduction when decoding at high frame rate or having high input resolution. It will be appreciated that the option of switching between these modes may be omitted and that one or other of the modes may be implemented in a decoder. In the case of the "THRU" mode, in inverse DCT module 104, IDCT on certain rows may be skipped, as those obtained inverse transform values would not be required by the downsampler.

Figure 3:
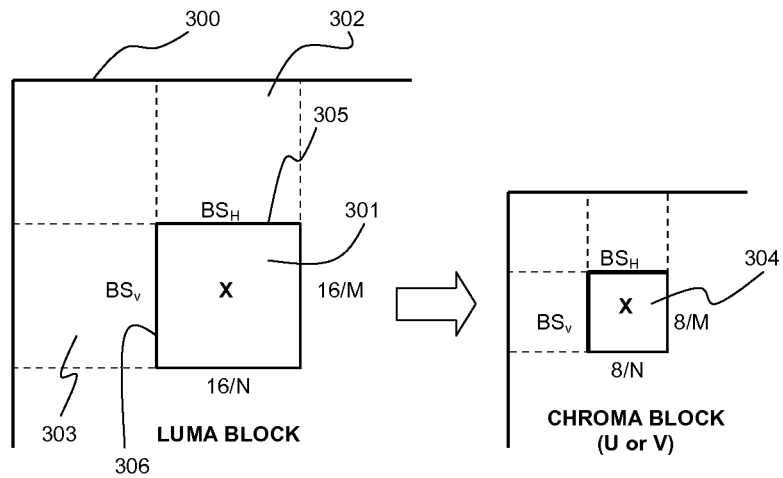
FIG. 3 depicts a programmable dynamic image filter module and block arrangement of YUV samples for the filtering of FIG. 1.
Figure 3:
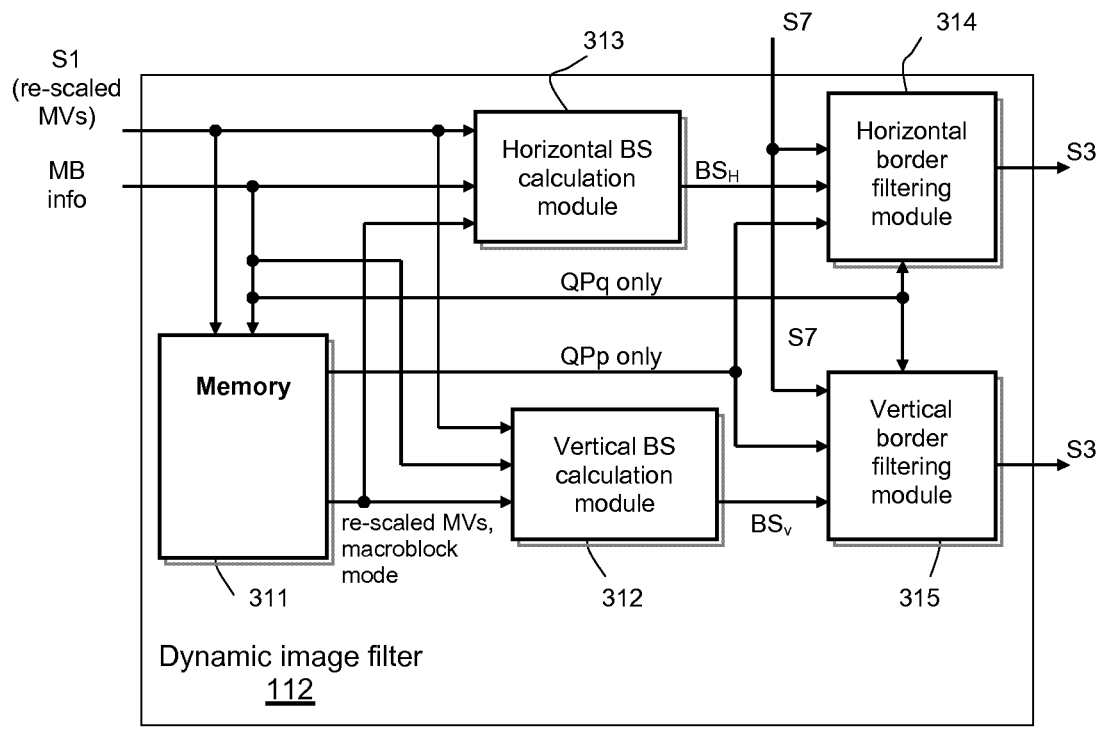

FIG. 3 illustrates an exemplary programmable dynamic image filter. Unfiltered input samples S7 of the unfiltered frame 300 are organized into sequence of (16/N)×(16/M) Luma blocks 301 each with two (8/N)×(8/M) corresponding Chroma blocks (U and V), such as 304. The actual size of blocks S7 may be programmable or fixed. For example, having N and M both of factor 2 will result sequence of input 8×8 Luma block and 4×4 Chroma blocks for the image filter apparatus. Due to the nature of the filtering algorithm, the smallest sizes permitted for the S7 blocks are 4×4 Luma samples and 2×2 Chroma samples. The numbers 16 and 8 in the block size formula are derived from maximum macroblock size utilized by current block based video decoders for the given sample type (e.g. for YUV4:2:0).

It can be seen that for every current block 301 that two borders exist with two neighbouring blocks: vertical border 306 with the block 303 to the left and horizontal border 305 with the block 302 above. The exemplary filtering operation affects only two samples on the each side of the border in the current and neighbouring block. Since for blocks located at the very top row of the image (i.e. horizontal case) or very left column (i.e. vertical case) the neighbouring blocks do not physically exist, the corresponding horizontal or vertical border is not filtered. Amount of filtering depends on the Border Strength (BS) values $BS_H$ and $BS_V$ that are computed individually for corresponding borders 305 and 306 on Luma samples only. In the chroma filtering case pre-computed BS values are re-used.

The actual dynamic image filter 112 apparatus suitably consists of two Border Strength calculation modules 312, 313; two border filtering modules 314, 315 and memory 311. The purpose of the memory 311 is to store MB information and re-scaled MVs S1 for rows and blocks above and to the left of the current block. This information is used to compute BS values and also to select filter parameters. In particular, apart from MVs, these are macroblock modes and macroblock quantization values QPp and QPq. These values may be derived from quantizer scale and depends on the particular video coding standard utilized by the video decoder 100.

Figure 4:
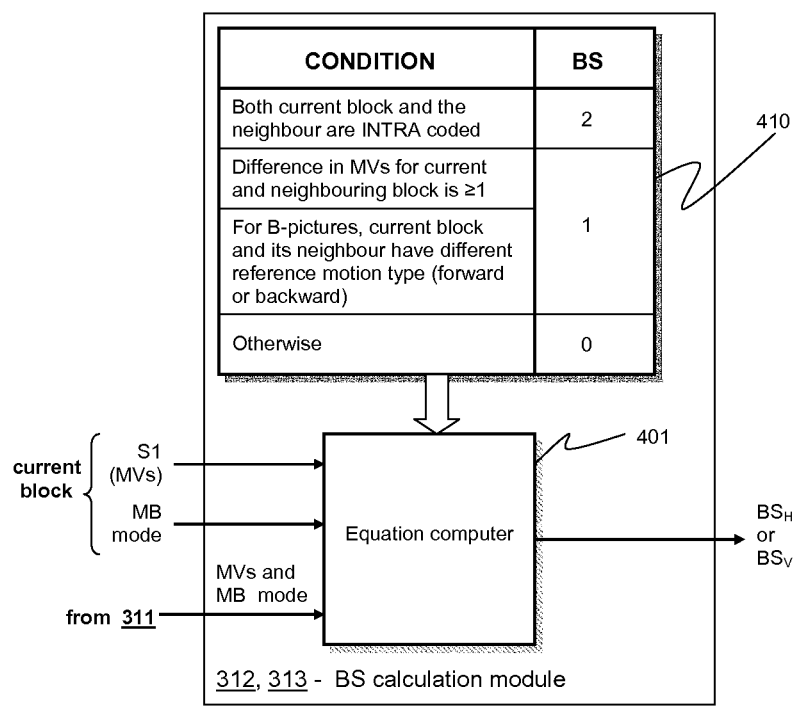
FIG. 4 shows the border strength calculation conditions for the filter of FIG. 3.

FIG. 4 depicts the exemplary border strength calculation module. It consists of a module 401 that computes the border strength (BS) value according to Table 410. The highest BS value of 2 corresponds to the strongest filtering and will be selected if both blocks are Intra coded. Moderate filtering is required for the motion compensated blocks (P- and B-type) in the case that the motion vectors of those blocks are different or different pictures are used as reference frames. This case corresponds to BS value of 1. In the remaining cases the blocking artifacts are unlikely to occur due to the absence of motion or Intra coding between the blocks, which corresponds to BS value of zero.

Figure 5:
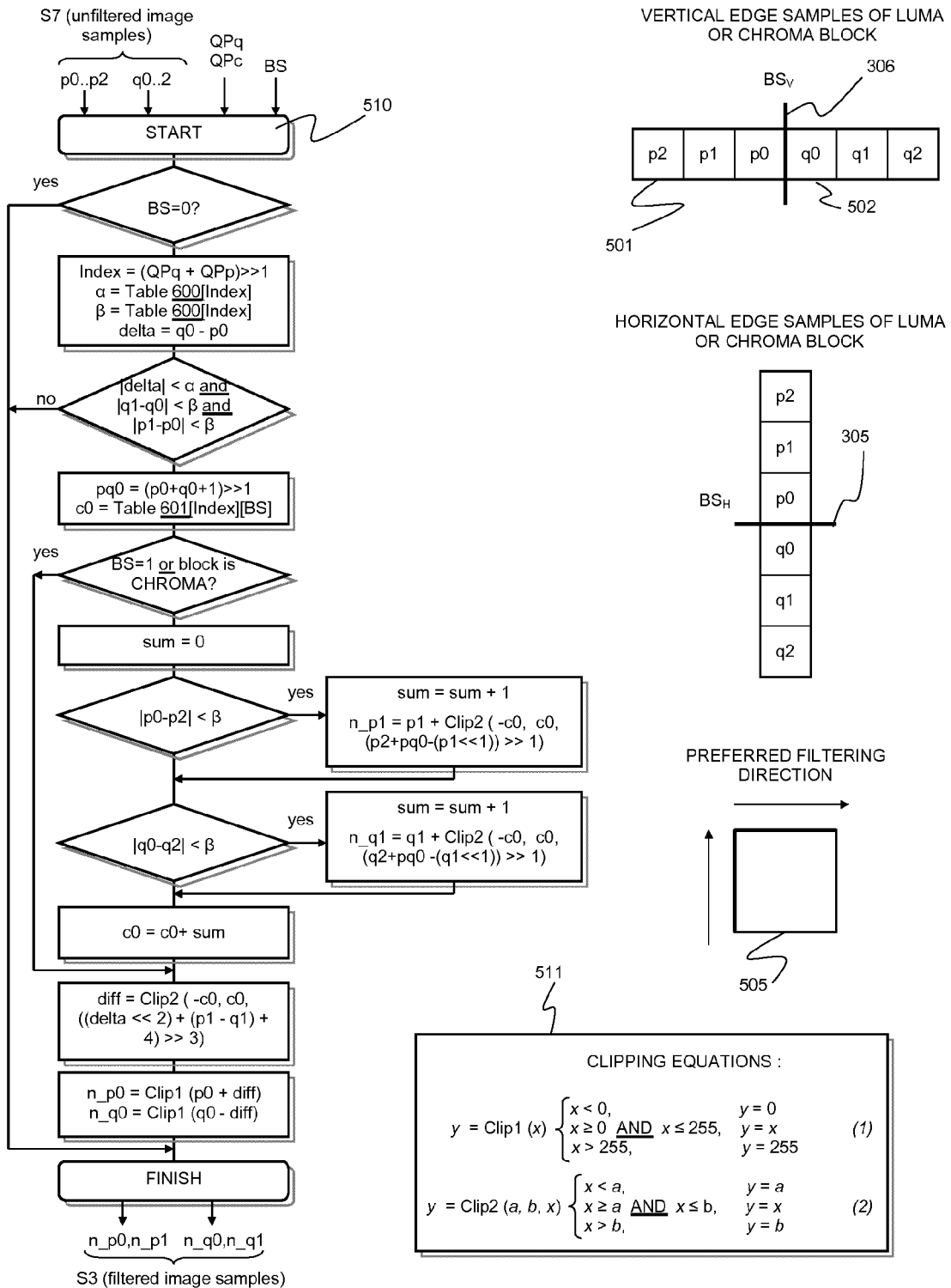
FIG. 5 is a flow chart that illustrates a filtering algorithm used by an exemplary programmable dynamic image filtering module of the invention.

FIG. 5 illustrates an exemplary filtering algorithm. The algorithm operates on input S7 for border samples q0 . . . 2 of the current block 502 and samples p0 . . . p2 of the neighbouring block 501. A flow chart 510 depicts a filtering of one set of p and q samples. Note that since the filtering block size is programmable and depends on N and M values, the full borders consist either of 16/N and 16/M Luma samples or 8/N and 8/M chroma samples, so the algorithm 510 is executed repeatedly on each pixel of the border. Since the filtering is performed on two borders (vertical and horizontal) simultaneously, the preferred direction of samples filtering is shown as 505. Other inputs for the algorithm include QPc and QPq values, also BS value computed by module 312 or 313 previously.

The purpose of the filtering algorithm is to determine if the difference between the border pixels is due to blocking artifacts or the natural image pixel gradient. For this purpose, two threshold values of $\alpha$ and $\beta$ are selected from a statistically pre-calculated Table 600 shown in FIG. 6, based on the Index which is average between QPc and QPq. The actual filter strength is determined by c0, which is selected from Table 601 also shown in FIG. 6, based on the Index and BS. For BS of 1 only samples p0 and q0 are filtered, while for BS of 2 this also includes p1 and q1. Note that Chroma input blocks are similar to the BS of 1 case. Filtered samples n_p, n_q are clipped into proper range, as shown in Equations 511 (1) and (2), to form the output S3 of the algorithm.

FIG. 6 illustrates exemplary Tables used by the filtering algorithm 510. Table 600 is used to obtain threshold values of $\alpha$ and $\beta$, while c0 is determined from the Table 601. In both cases the same Index value is used. For Table 601 the appropriate c0 is selected based on a combination of the Index and BS values. Note that the example in FIG. 6 is given for MPEG-2 video coding standard (the present method is independent of the broadcast standard used), where quantiser_scale_code (i.e. macroblock quantization parameter) has a range from 1 to 31, thus corresponding exactly to the Index value in the Tables 600 and 601. However, for other standards where the quantization parameter has a different range, a conversion module implementing the equation shown in 610 (3) can be used. In this case different Table contents for 600 and 601 are selected according to the broadcast standard being received. Herein, new values can be obtained as linear approximation between two "border" values of the original Table 600 and 601. The conversion example for the few rows of Table 600 is illustrated in FIG. 6 as Table 603.

Whilst the present application has been described with reference to an exemplary embodiment, these are not to be taken as limiting and it will be appreciated that a variety of alterations may be made without departing from the spirit or the scope of the invention as set forth in the claims which follow.

The invention claimed is:

1. An apparatus for downsampling video data comprising block data and motion vectors comprising:
   a) a motion vector scaler for downscaling the motion vectors;
   b) a block data decoder for producing transformed block data;
   c) a block downsampler for only downsampling the transformed block data produced by the block data decoder to produce downsampled block data;
   d) a frame memory for storing at least one downsampled frame of the video;
   e) a frame module employing the downscaled motion vectors, the down sampled block data, and at least one downsampled frame of video from the frame memory to produce a subsequent downsampled frame of video; and e) a filter for filtering the subsequent downsampled frame of video and storing the filtered downsampled frame in the frame memory.

2. An apparatus according to claim 1, wherein the downscaling of the motion vector is programmable.

3. An apparatus according to claim 1, wherein the downsampling of the block downsampler is programmable.

4. An apparatus according to claim 1, wherein the data blocks comprise a matrix of 16 by 16 data values and the downsampled data block comprises a matrix of 16/N by 16/M data values, where N and M are non-zero integer numbers.

5. An apparatus according to claim 1, wherein the downsampler employs an adder and divider to produce an average value for subblocks in the transformed block being downsampled.

6. An apparatus according to claim 1, wherein the filter is a dynamic filter and wherein the filter is configured to distinguish between blocking artifacts or inherent gradients present in the image and adjusts the degree of filtering to reduce blocking artifacts in the downsampled frame.

7. An apparatus according to claim 6, wherein the filter is configured to distinguish between blocking artifacts and inherent gradients using at least one border strength value, wherein the at least one border strength value for a block is determined with respect to one or more neighbouring blocks, and wherein increased filtering is applied for higher border strengths.

8. An apparatus according to claim 7, wherein a vertical and a horizontal border strength are calculated.

9. An apparatus according to claim 8, wherein the vertical border strength for a block is calculated with respect to one vertically adjacent block.

10. An apparatus according to claim 9, wherein the horizontal border strength is calculated with respect to one horizontally adjacent block.

11. An apparatus according to claim 8, wherein a first filter is performed based on the vertical strength.

12. An apparatus according to claim 11, wherein a second filter is performed based upon the horizontal strength.

13. An apparatus according to claim 1, wherein for a chroma data block, the border strength is calculated from previously calculated LUMA border strengths.

14. An apparatus according to claim 1, wherein the downsampler applies a downsampling ratio when downsampling and where the downsampling ratio is adjustable.

15. An apparatus according to claim 14, wherein the downsampling ratio is adjustable between a factor of 2 or 4 in the horizontal or the vertical direction.

16. An apparatus according to claim 1, wherein the apparatus further comprises a screen for displaying the frames.

17. An apparatus according to claim 1, wherein the apparatus is a handheld device.

18. An apparatus according to claim 1, wherein the apparatus is a mobile phone or similar battery-powered or portable device.

19. An apparatus according to claim 1, wherein the apparatus is a TV and the downsampled image is employed to generate a 'picture in picture' feature of the TV.

20. An apparatus according to claim 1, wherein the video is coded in accordance the MPEG format.

21. An apparatus according to claim 6, wherein the filter employs macroblock quantization values to generate an index value, wherein a first threshold value is retrieved from a first look-up table using said index value, and wherein the filter is not applied where the difference between adjoining pixels on either side of a border is less than said first threshold value.

22. An apparatus according to claim 21, wherein the values of the first look-up table are as set forth in column a of table 600 in FIG. 6.

23. An apparatus according to claim 21, wherein a second threshold value is retrieved from a second look-up table using said index value and wherein the filter is not applied where the difference between corresponding pixels adjacent to adjoining pixels on either side of a border is less than said second threshold value.

24. An apparatus according to claim 23, wherein the values of the second look-up table are as set forth in column 13 of table 600 in FIG. 6.

25. An apparatus according to claim 23, wherein a third threshold value is retrieved from a third look-up table using at least said index value and wherein said third value is employed in at least one clipping function within said filter.

26. An apparatus according to claim 25, wherein a border strength value is also employed in the retrieval of the third threshold value from the third look-up table.

27. An apparatus according to claim 26, wherein the values of the third lookup table are as set forth in table 601 in FIG. 6.

* * * * *